United States Patent [19]
Pomerleau et al.

[11] Patent Number: 5,944,124
[45] Date of Patent: Aug. 31, 1999

[54] COMPOSITE MATERIAL STRUCTURES HAVING REDUCED SIGNAL ATTENTUATION

[75] Inventors: Dan Pomerleau, Calgary, Canada; Brian Spencer, Lincoln, Nebr.; Mark Voghell, Edmonton, Canada; Doug MacLean, Ardrossan, Canada; Paul Pastushak, Edmonton, Canada

[73] Assignee: LWT Instruments, Inc., Calgary, Canada

[21] Appl. No.: 08/965,782

[22] Filed: Nov. 7, 1997

Related U.S. Application Data

[63] Continuation of application No. 08/567,337, Dec. 5, 1995, abandoned.

[51] Int. Cl.⁶ .............................. F16L 9/14; F16L 39/00
[52] U.S. Cl. ...................... 175/320; 138/109; 138/141; 166/242.1; 285/174; 285/423
[58] Field of Search ............... 166/242.1; 175/320; 138/109, 140, 141; 174/47; 285/174, 369, 417, 423

[56] References Cited

U.S. PATENT DOCUMENTS

| | | | |
|---|---|---|---|
| 3,206,537 | 9/1965 | Steward | 166/242.1 X |
| 4,504,736 | 3/1985 | Smith, Jr. et al. | 250/256 |
| 4,592,421 | 6/1986 | Hoffmann et al. | 166/66 |
| 4,968,545 | 11/1990 | Fellman et al. | 428/36.1 |
| 5,097,870 | 3/1992 | Williams | 138/115 |
| 5,128,902 | 7/1992 | Spinnler | 367/82 |
| 5,132,624 | 7/1992 | Kitson | 324/339 |
| 5,138,313 | 8/1992 | Barrington | 34/854.6 |
| 5,212,495 | 5/1993 | Winkel et al. | 343/872 |
| 5,233,737 | 8/1993 | Policelli | 285/423 X |
| 5,250,806 | 10/1993 | Rhein-Knudsen et al. | 250/254 |
| 5,332,049 | 7/1994 | Tew | 175/320 |
| 5,339,036 | 8/1994 | Clark et al. | 324/338 |
| 5,394,149 | 2/1995 | Fujita et al. | 342/1 |
| 5,398,975 | 3/1995 | Simmons | 285/93 |
| 5,443,099 | 8/1995 | Chaussepied et al. | 138/109 |
| 5,507,346 | 4/1996 | Gano et al. | 166/242.1 |

FOREIGN PATENT DOCUMENTS

| | | |
|---|---|---|
| 2044623 | 1/1990 | Canada . |
| 0704717 | 4/1996 | European Pat. Off. . |
| 91/14123 | 9/1991 | WIPO . |

*Primary Examiner*—David J. Bagnell
*Attorney, Agent, or Firm*—Roylance,Abrams,Berdo & Goodman, L.L.P.

[57] ABSTRACT

The present invention relates to composite material structures having reduced signal attenuation properties. In particular, the invention relates to composite drillstring components with electromagnetic properties and acoustic properties that enable the use of electromagnetic, acoustic and nuclear sensing equipment to obtain data from a wellbore from within a drill pipe. In a specific embodiment, a composite tube is incorporated with end-fittings which enable its incorporation into a drillstring thereby permitting the use of logging equipment from within the composite tube.

43 Claims, 9 Drawing Sheets

$T = (d\mu P - PL) F$, WHERE
T = APPLIED TORQUE = 600,000 LB.-IN.
d = 2.367 INCHES (AVERAGE)
$\mu$ = COEFFICIENT OF FRICTION = .2
L = .327 INCHES (AVERAGE)
F = NUMBER OF FLATS = 8
SOLVING FOR P   P = 93,710 POUNDS

COMPOSITE MATERIAL STRUCTURES HAVING REDUCED SIGNAL ATTENTUATION

This is a continuation of application Ser. No. 08/567,337 filed Dec. 5, 1995, now abandoned.

FIELD OF THE INVENTION

The present invention relates to composite material structures having reduced signal attenuation properties. In particular, the invention relates to composite drillstring components with electromagnetic properties and acoustic properties that enable the use of electromagnetic, acoustic and nuclear sensing equipment to obtain data from a wellbore from within a drill pipe. In a specific embodiment, a composite tube is incorporated with end-fittings which enable its incorporation into a drillstring thereby permitting the use of logging equipment from within the composite tube.

BACKGROUND OF THE INVENTION

In the process of excavating a borehole, it is currently the practice to acquire information concerning the formation through the use of methodologies known as measurement while drilling (MWD), logging while drilling (LWD), logging while tripping (LWT), and measurement while tripping (MWT). These methodologies use sensing technologies and devices such as spectral gamma ray, neutron emission and detection, radio frequency tools, nuclear magnetic resonance, acoustic imagery, acoustic density, acoustic calipers, gamma ray emission and detection, density logs, sonic logs and a range of other instrumentation to obtain detailed information concerning the formation surrounding a borehole. These measurement technologies require sophisticated devices or procedures to obtain high quality data about a formation, the level of sophistication a direct result of the severity of the downhole operating environment. Furthermore, this measurement equipment may be designed to form a component of the drilling equipment which requires further sophistication in the integration of the measurement equipment within the drilling equipment. However, the marriage of measurement equipment with standard drilling equipment is limited in both the quality and type of data which can be obtained from a borehole.

For example, where a logging or measurement tool is used within a drillstring, the type of data and the resolution of that data is limited by the material properties of the drill pipes of the drill string. In normal practice, drill pipes are steel and, accordingly, limit the ability of logging or measurement tools to acquire a broad range of information. In particular, electromagnetic and acoustic sensing devices cannot be operated from within a metal drill pipe in view of the inability of an electromagnetic or acoustic sensing device to operate through a metal drill pipe. Secondly, the use of sensing devices operable through a metal pipe may result in severe attenuation of any data signal, thereby limiting the accuracy of obtaining a data log of the formation.

Once a borehole has been fully excavated, operators often continue to acquire formation data from the borehole over the life of its production. In order to maintain stability in the borehole, it is often necessary for the borehole to be lined with a casing, normally a metal casing cemented into place. Again, the use of metal may prevent or severely attenuate the operation of sensing equipment.

Accordingly, there has been a need for tubing for use in both the drilling and casing phases of a borehole which does not prevent or severely attenuate the use of sensing equipment within the borehole. Thus, there has been a need for tubing that enables the use of a full range MWD, LWD, LWT and MWT technologies.

The drilling/borehole environment is an extremely abrasive, high stress environment that requires very high standards of performance and quality in drilling equipment. These standards and performance characteristics for drilling equipment are set forth by the American Petroleum Institute (API Specification 7 for Rotary Drill Stem Elements) and detail numerous specifications for drill pipes and casings (API Specification 5 for casings) for use in boreholes.

Thus, there has been a need for tubing which meets API specifications for drillstring components which further provide the necessary conductivity to the operating frequencies of sensing equipment used in MWD, LWD, LWT and MWT operations. Specifically, there has been a need for composite tubing conductive to radio frequency and acoustic signals which also result in a reduction of attenuation of natural decay waves/particles (gamma rays, beta particles, etc.) passing through the tubing.

It is, however, impractical for a composite tube to replace a steel drill string. Accordingly, in that the use of MWD, LWD, LWT, and MWT instrumentation requires only a relatively small window to obtain downhole data, only a corresponding short section of composite tubing is required to provide the window. Thus, the incorporation of a relatively short section of composite tubing within a drill string requires metal/composite junctions with performance characteristics equal to those of the composite and metal sections of the drillstring which thereby enable the composite tubing to be attached to metal components of the drillstring in a conventional manner.

As indicated above, the downhole drilling environment is severe in terms of abrasion, pressure and temperature. In that a composite tube does not have the abrasion resistance qualities of steel, there has been a need for a composite tube with an outer surface material that reduces abrasive wear to a drilling collar or casings caused by contact with the borehole.

Conductive fibres such as carbon provide electromagnetic shielding and are often used to enhance the shielding capabilities of insulating plastics. For example, the addition of carbon fibre to nylon increases signal attenuation. Accordingly, in that it is known that the choice of carbon fibre as a material for a reinforcing medium is detrimental to the objective of EM transparency, there has been a need for a composite tube design wherein the design facilitates the use of carbon fibre while providing acceptable EM transparency.

Accordingly, there has been a need for a composite tube design wherein the composite microstructure provides both physical strength and an acceptable EM transparency to permit the use of sensing equipment from within the tube.

A search of the prior art has revealed that the above problems have not been addressed. For example, U.S. Pat. No. 5,097,870, U.S. Pat. No. 5,332,049, U.S. Pat. No. 5,398,975 and PCT Publication WO 91/14123 teach composite tube structures. U.S. Pat. No. 5,250,806, U.S. Pat. No. 5,339,036 and U.S. Pat. No. 5,128,902 teach various apparatuses and methods for collecting downhole data. Canadian Patent Application 2,044,623 discloses a method for reducing noise in drillstring signals.

SUMMARY OF THE INVENTION

In accordance with the invention, a composite body is provided having signal attenuation properties for a physical and performance design point, the composite body comprising a plurality of fibre layers impregnated with a resin, wherein each fibre layer is selected from fibre materials having different mechanical and signal attenuation properties and wherein each fibre layer is orientated with respect to a reference axis in accordance with desired mechanical, signal attenuation and phase shift properties of the design point.

Preferably, the fibre layers include any one of or a combination of fibreglass fibres, aramid fibre and carbon fibre wherein the carbon fibre is oriented at ±10° with respect to a reference axis to minimize signal attenuation and the resin is an epoxy resin.

In a preferred embodiment, the invention provides a composite tube for use in a drillstring, the composite tube comprising a plurality of resin-impregnated fibre layers of a first type and a second type wherein the first type layers are interspersed by layers of the second type, the composite tube adapted for receiving a logging tool.

Preferably, the first layer type is wound at ±10° with respect to the longitudinal axis of the tube, the first layer type comprising 25–50% high modulus carbon fibre, 0–44% aramid fibre and 16–50% high strength fibre glass and the second layer type is wound at 90° with respect to the longitudinal axis of the tube, the second type comprising 100% high strength fibreglass.

In another form, the first layer type constitutes 90% of the total wall thickness of the tube and the second layer type is equally interspersed through the tube wall at 1–9 discrete radial positions.

In a specific form, the invention provides a composite tube wherein the first layer type is wound at ±10° with respect to the longitudinal axis of the tube, the first layer type comprising 25% high modulus carbon fibre, 25% aramid fibre and 50% high strength fibre glass.

In a another form, the composite tube has a signal attenuation response of at least 70% at 20 Khz and a microstructure with a fibre volume fraction of 60%.

When used in a drillstring, the tube is preferably 7–31 feet long and meets the performance requirements detailed in Table 1 including tensile load, compressive load, torsional load, internal pressure, endurance limit, lateral stiffness, impact strength, tensile strength, and yield strength which meet or exceed the standards of the American Petroleum Institute Specification 7.

In another form, the composite tube further comprises an abrasion resistant coating on the outer surface of the tube and/or the resin-impregnated fibre layers include a ceramic powder blended with the resin.

In another preferred form, the composite tube further comprises end-fittings integrally attached to the composite tube by additional fibre layers and resin.

Preferably, the end-fittings include:
a tube seat for seating the end-fitting within the basic composite tube;
at least one compression bearing surface for supporting a compression load between the end-fittings and the basic composite tube;
at least one torsional transfer surface for transferring torsional load between the end-fittings and the basic composite tube;
a bending stress transfer surface for supporting a bending stress load between the end-fittings and basic composite tube; and
at least one axial tension surface for supporting an axial tension load between the end-fittings and basic composite tube.

In a preferred form, the torsional transfer surface(s) comprises eight surfaces which are either parallel or tapered with respect to the longitudinal axis of the end-fittings.

Preferably, the end-fittings are attached to the basic composite tube by additional winding of resin-impregnated fibre and where the additional winding is high modulus carbon fibre wound at 90°.

In a still further form, the end-fittings further comprise stabilizers which may include rutile or zirconium focussing lenses for use with micro pulse imaging radar.

In a specific form, the invention provides a drillstring member having a composite tube middle section with integral end-fittings, the composite tube middle section having a signal transparency comprising:

a basic composite tube, the basic composite tube including a plurality of resin-impregnated fibre layers of a first and second type wherein the first type layers are interspersed by layers of the second type and the first layers are wound at ±10° with respect to the longitudinal axis of the tube, the first layer type comprising 40% high modulus carbon fibre, 44% aramid fibre and 16% high strength fibre glass and the first layer constitutes 90% of the total wall thickness of the tube and wherein the second layer type is wound at 90° with respect to the longitudinal axis of the tube, the second type comprising 100% high strength fibre glass equally interspersed through the tube wall at a plurality of discrete radial positions;

end-fittings, the end-fittings including:
a tube seat for seating the end-fitting within a basic composite tube;
at least one compression bearing surface for supporting a compression load between the end-fittings and the basic composite tube;
at least one torsional transfer surface for transferring torsional load between the end-fittings and the composite basic tube;
a bending stress transfer surface for supporting a bending stress load between the end-fittings and basic composite tube;
at least one axial tension surface for supporting an axial tension load between the end-fittings and basic composite tube.

In another embodiment of the invention, a method of forming a composite tube with integral end-fittings is provided comprising the steps of:

a. winding a basic inner tube of a resin-saturated fibre on a steel mandrel;
b. curing the resin to form a cured tube;
c. removing the mandrel from the cured tube;
d. cutting the cured tube to length to form a basic tube;
e. inserting an alignment mandrel within the basic tube and seating end-fittings within the basic tube over the alignment mandrel;
f. winding an outer layer of resin-saturated fibre over the basic tube and end-fittings to form composite tube with end-fittings.

In another embodiment, an adhesive coating is added to the outer surface of the composite tube to increase wear resistance.

BRIEF DESCRIPTION OF THE DRAWINGS

These and other features of the invention will be more apparent from the following description in which reference is made to the appended drawings wherein.

DETAILED DESCRIPTION OF THE INVENTION

Figure 1:
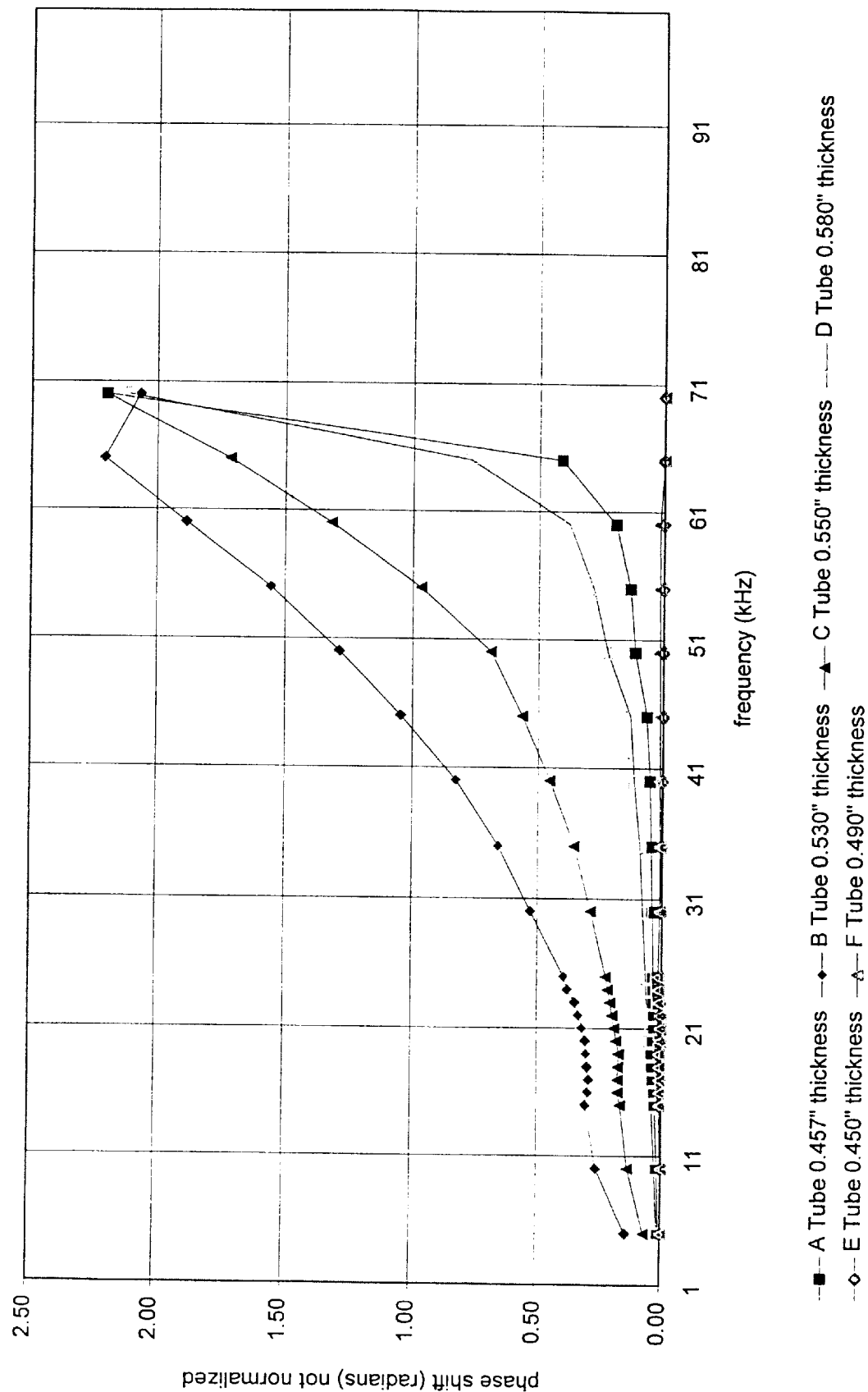
FIG. 1 is a graph of phase shift vs. frequency for a number of basic composite tube samples on a log x, linear y scale.
Figure 2:
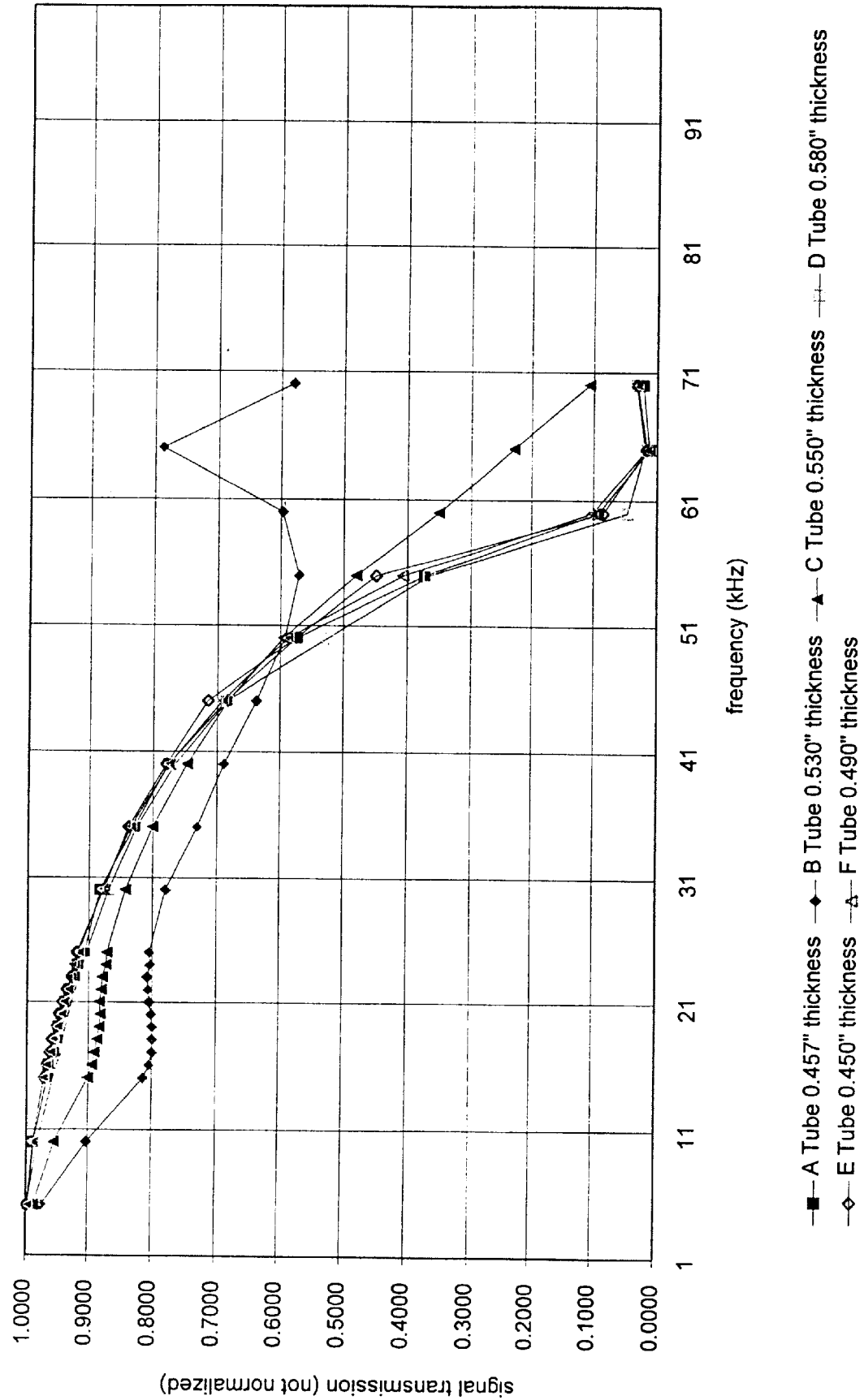
FIG. 2 is a graph of signal attenuation vs. frequency for a number of basic composite tube samples on a log x, linear y scale.

It has been discovered that the electromagnetic attenuation properties of a composite body are affected by the orientation of the fibre layers constituting the body, thus permitting the design and construction of composite bodies which heretofore have not been suitable for particular applications.

As indicated above, it is known that the use of high modulus carbon fibre in a composite body affects the electromagnetic attenuation properties of the composite body. It is also known that materials such as fibreglass and aramid fibre do not significantly affect these properties. For particular applications, high modulus carbon fibre has superior strength and performance characteristics over fibreglass and aramid fibre and is, accordingly, well suited for certain applications. Thus, in the past, where it is desirable to provide a composite body having electromagnetic transparency properties, the use of carbon fibre is minimized.

However, the design of a composite body with particular strength and/or performance properties within particular physical dimensions requires that the composite body meets or exceeds the design conditions while remaining within the size restrictions. Accordingly, with the introduction of additional parameters, such as minimal electromagnetic signal attenuation, it has previously been considered that the use of a known attenuating material such as carbon fibre must be minimized or eliminated in order to meet this electromagnetic attenuation design requirement. However, in certain applications, in view of the physical size requirements of the composite body and/or the strength/physical performance requirements, the use of carbon fibre cannot be eliminated while still meeting the strength/physical performance requirements.

In overcoming this problem, the subject application has recognized that the carbon fibre orientation within the composite body is related to the electromagnetic attenuation properties of the composite body, thus rendering it possible to design a composite body with the required high strength/physical size limitations while also achieving the desired electromagnetic attenuation properties.

In particular, the subject invention has recognized that the orientation of carbon fibre within a composite body and, in particular, a composite tube enables sensing equipment utilizing electromagnetic sensors to be placed within the composite tube which provide an acceptable data acquisition signal. Essentially, by dispersing the carbon fibre with glass fibre in conjunction with a low wrapping angle, a highly conductive annulus of conductive fibre is avoided.

In a specific application, this invention has developed a composite/metal tube for use in a drillstring for downhole drilling operations. With this design of composite/metal drilling tube, a segmented design is provided with end-fittings on either side of a composite middle section. The end-fittings enable integration of the composite/metal drilling tube to an existing steel drillstring while the composite middle section enables the placement and use of logging while tripping, logging while drilling, measurement while tripping and measurement while drilling equipment within this section. In order to permit the use of logging or measurement equipment, the composite middle section has an acceptable electromagnetic transparency in the range of 0 kHz–200 kHz.

Accordingly, the design of a composite tube with integral end-fittings for use in a drillstring while having specific electromagnetic properties, requires the composite tube section to have both the physical strength, performance and size characteristics of existing steel drilling tubes (as per API specifications, where applicable) as well as the required electromagnetic properties. Furthermore, the composite tube with integral end-fittings must provide a composite/metal junction which provides optimal performance characteristics, primarily a satisfactory durability in the high stress drilling environment.

The composite/metal tube has the following components:
1. the basic composite tube;
2. the end-fittings; and,
3. the junction between the basic composite tube and end-fittings.

As indicated, in addition to the physical strength characteristics of the composite tube, electromagnetic transparency properties are also required to permit logging equipment to effectively record downhole characteristics. Reduced signal attenuation provides superior data acquisition.

Primarily, electromagnetic transparency is required in the 20 kHz range, however, reduced attenuation in the 0–200 kHz range is also useful.

Logging equipment may include both electrode devices and/or induction devices to obtain information from the formation. Electrode devices require direct contact with the mildly conductive borehole mud to inject currents into the formation. When measurements are performed in lower conductivity air-filled or oil-based boreholes, conventional electrode-based methods are not possible. As this measurement method is limited to direct contact with a borehole mud, measurements through neither a highly conductive all-steel drill collar nor a composite drill collar are possible.

An induction device on the other hand measures the formation conductivity through the use of secondary eddy currents induced into the formation. This measurement is superior in lower conductivity air-filled or oil-based boreholes and it can also tolerate the more typically encountered mildly conductive mud environments. Induction logging has proven to be very versatile and today forms the primary means of evaluating formation resistivity. As in the case of electrode devices, measurements are not possible through an all-steel drill collar but are possible through a mildly conductive composite collar.

In the basic induction device, a constant amplitude and frequency alternating current is fed to a transmitter coil. The resultant magnetic field produced around the transmitter coil, induces eddy current flow in the formation. Assuming a cylindrical symmetry, the eddy currents will flow in paths coaxial with the borehole. The eddy currents induce an alternating voltage in the detector coil that is a full 180° out of phase with the transmitter current. The magnitude of the eddy currents are proportional to the conductivity of the formation.

The resistive component of the detector signal, forms the basis of the induction measurement. A 90° out of phase direct coupling signal is also received by the detector coil but is electronically filtered out.

Current induction devices designed to measure the resistivity (in ohm m) of a formation, typically operate at a frequency of 20 kHz. The formation resistivity has been traditionally documented on hard copy over a four decade print out range; from 0.2 to 2000 ohm m.

Furthermore, the use of composite material also allows for the use of acoustic transmitting and receiving devices to take measurements of the well bore diameters. This includes, but is not limited to, the implementation of acoustic transmitting and receiving devices used to measure the acoustic impulse travel time through the formation immediately adjacent to the bore hole. This travel time, $\Delta t$, the specific acoustic time, varies according to mineral composition, porosity, and the fluid present in the formation (in situ). Accordingly, further data, such as rock or mechanical properties, location of fractures can also be obtained. Imaging using acoustic reflection data is also possible. The propagation of acoustic waves through composites and compensation for the composite acoustic properties can be undertaken—yielding the above whereas propagation through steel pipes is highly problematic.

Still further, the low density of the composite material allows for enhanced transition of gamma/neutron/beta materials through the body of the collar. Allowing for more accurate detection of same with receivers located inside the collar.

Design of Basic Composite Tube

The basic design of the composite tube requires low moisture absorption, heat resistance, and corrosion resistance. The composite tube must also show the mechanical performance of an existing all-steel design as shown in Table 1. Calculations which follow refer to a nominal collar size of 6¾–7 inch. It is understood that similar calculations may be applied in the design of tools of different dimensions.

Basic Tube Construction

A basic composite tube was prepared by a computer controlled filament winding process. This process adds successive layers of resin-impregnated fibre over a steel mandrel to build the basic tube. The winding speed, spool location and spool fibre are controlled to enable the fibre, the fibre orientation and thickness to be controlled to build up successive layers of fibre in accordance with the desired end-product characteristics. Generally, the fibre and fibre orientation are selected in accordance with the physical and electromagnetic properties of the design.

In the specific design of a composite tube for use in a drillstring, there are two main types of fibre layers in the basic composite tube, the first type being a low angle wrap (for example, ±10° off the longitudinal axis of the tube) and the second type being circumferentially wrapped around the tube (90° to the longitudinal axis of the tube). Each layer is wrapped with one half of the fibre aligned at its positive wind angle and the other half at the negative wind angle. The first layer may comprise a number of different fibres within that layer such as carbon fibre, aramid fibre or fibreglass. For a given design having an electromagnetic transparency, the amount of carbon fibre is minimized while still permitting a given physical strength. The second layer type may also comprise a number of different fibres within that layer. However, if the design requires electromagnetic transparency, carbon fibre would not be included in this layer.

Preferably, the second layer type is equally interspersed through the composite tube wall at a number of discrete radial positions in order to improve the strength of the composite laminate.

The resin used is a standard epoxy resin. Evaluation of a specially formulated resin exhibiting low electrical attenuation properties was evaluated in a subscale test specimen and was found not to offer significant benefit in lowering the electrical attenuation. The specific resin used for the test samples was a bisphenol F resin with a MTHPA curing agent.

The layer thickness is typically between 0.01 and 0.040 inches. For the specific drillstring tube, the layer thickness of the first type layers are 0.038 inches and 0.035 inches for the second type layers.

Curing is conducted as soon as all the filament winding is complete in a convection oven. The cure schedule follows the resin manufacturers recommended procedure. A typical cure consists of maintaining the oven temperature at 180° F. for 4 hours, raising the temperature to 225° F. for 4 hours, raising the temperature to 300° F. for 6 hours, turning the oven off and allowing the part to cool slowly to room temperature in the oven.

After curing, the mandrel is removed and the inner tube cut to length.

The baseline design for the composite tube used GRAFIL HR40 carbon fibre (a high modulus carbon fibre) (Courtaulds Advanced Materials, Sacramento, Calif.), DuPont KEVLAR 149, (a high strength aramid fibre) OWENS-CORNING E (52–56 wt % silicon dioxide (silica), 16–25 wt % calcium oxide, 12–16 wt % aluminum oxide, 5–10 wt % boron oxide, 0–5 wt % magnesium oxide, 0–2 wt % sodium, potassium oxides, 0–0.8 wt % titanium oxide, 0.05–0.4 wt % iron oxide and 0–1.0 wt % fluorine) and S-2 (65 wt % silicon oxide (silica), 25 wt % aluminum oxide and 10 wt % magnesium oxide) glass, and a 350° F. cure cyanate ester epoxy resin. The tube was fabricated with a number of laminate layers with thicknesses and fibre orientation angles as shown in Table 2. Table 3 shows the mechanical properties of the baseline fibres. The resin system utilized for the baseline design was Shell's DPL 862 resin. Other fibres which may be used include 3M NEXTEL, an alumina-boria-silica ceramic fibre. Other resins may be used such as the Bryte Technologies Inc. EX-1545 RTM System.

Lateral Stiffness

In accordance with the requirements as set forth in table 1, the composite tube was designed for the required lateral stiffness (70–80% of a similar steel section) with the required inside and outside diameters of the tube, namely 2.25 inches, minimum, and 7.25 inches, maximum, respectively. Accordingly, with a lateral stiffness of a steel section of 2.9E9 Zlb-in$^2$ with a 29 msi (axial modulus of steel), the minimum stiffness of the composite tube is 2.03E9 lb-in$^2$. With a 7.25 inch outside diameter and 2.5 inch inside diameter, the minimum axial modulus must be at least 15.1 msi.

A baseline tube design was designed having an axial modulus of 17.8 msi.

Stress and Strain Analysis of Basic Composite Tube

The basic composite tube was analyzed for stress and strain under a combined loading condition of 800,000 pound axial tension load and a 50,000 lb-ft torsion load. The laminate design at a section away from the shaft end was analyzed using classical lamination theory. A description of this analysis is found in *Mechanics of Composite Materials* by Robert M. Jones (published by McGraw-Hill Book Company, 1975) and was used to determine layer stress and strain state under external loading conditions. The analysis provides a point stress analysis of a laminate under in-plane loads. The laminate constitutive relation is formulated and is used to determine mid-plane strains and curvatures which arise due to in-plane loads. The mid-plane strains and curvatures are then used to determine the layer strains and, therefore, the stresses in each layer of the laminate. The loads used in the program are input as running loads. The axial and torsion running loads for the composite body are calculated below.

Only the composite material within the zone 5.25 inch inside diameter to 7.25 outside diameter was used in the following analysis. The material below 5.25 inch diameter was considered to only provide compressive load carrying capability.

Axial Running Load, $N_x$
$\sigma$=load/area
$N_x$=$\sigma$t=load*thickness/area at 800,000 lb. tensile load
$N_x$=800,000(1.0)/19.6=40,816 lb/in.
Torsion Running Loads $N_{xy}$
$\sigma$=Tr/J
T=Torque
r=Average radius
J=Polar moment of inertia
$N_{xy}$=$\sigma$t=T/2$\pi$r$^2$
t=wall thickness at 50,000 lb.-ft
$N_{xy}$=50,000(12)/(2$\pi$(6.25/2)$^2$)=9778 lb./in.

The material properties at a shaft section away from the metal end-fittings are presented in Table 4, the design allowables are presented in Table 5. The stresses and strains from the combined axial and torsion load are shown in Table 6. Note that all margins are positive under these loads.

Next the column buckling of the composite tube was examined using Eulers formula for pin-ended columns.
Critical Buckling Load, $P_{cr}$
$P_{cr}$=$\pi^2$EI/L$^2$
E=Axial Modulus
I=Moment of Inertia
L=Length
Assuming a composite body length of 120 inches;
$P_{cr}$=$\pi^2$(2.03E9)/120$^2$=1,391,000 pounds.

The maximum compressive impact load is 300,000 pounds.

Electromagnetic Transparency Testing of the Basic Composite Tube

Tube Sample A was constructed as a control to compare variations in design with respect to the expected attenuation and phase response. Tube A also served as a reference in the manufacture of the test apparatus.

Tube Sample A was a 100% carbon fibre composition, constructed from GRAFIL HR-40 fibre, which has a lower conductivity in comparison to Grafil carbon fibre. As well, the HR-40 fibre has inferior mechanical properties making it an inappropriate choice for an EM transparent tube.

Tube Samples B & C were constructed from the mechanically superior GRAFIL 55-500 fibre of varying percentage concentrations. The carbon fibre wrapping during construction was confined to the coaxial (is. circumferential) orientation.

Tube Sample D was constructed of GRAFIL 55-500 carbon fibre with the coaxial carbon fibre wrapping reduced to the minimum allowed by the mechanical performance constraint.

Tube Samples E & F are duplicates of Tube Sample D but with differing resin properties and a reduced carbon fibre percentage concentration.

Tube Sample G was constructed with half the carbon fibre percentage concentration over the previous tube samples; E and F. KEVLAR fibre was substituted for the carbon fibre that was removed.

A summary of the construction of these tubes and a summary of the electromagnetic testing results is shown in Table 7.

Testing of the Composite Samples for Induction Characteristics

The test tubes were subjected to testing for their induction characteristics.

The test apparatus consisted of two coaxial encircling coils located on the interior (transmitter) and exterior (detector). A signal generator was connected to the interior coil and a constant amplitude. A variable frequency (ac) signal was fed into the coil. Measurements of voltage and phase were taken from the exterior coil with reference to the interior coil.

The skin depth equation describes the relationship between the amplitude and phase of an ac signal as it propagates through a conductive material. The equation predicts that the amplitude will be attenuated as an exponential function of distance and phase will by delayed or time delayed as a function of distance.

Quantitatively the equation is expressed as:

$$\delta \text{ (skin depth in metres)}=1/(\pi^* \text{ freq. }^* \mu_r^* \mu_o^* \sigma)^{1/2}$$

where, $\mu_r^*\mu_o$=the magnetic permeability, where $\mu_r$ is taken to be equal to 1 for composite materials and $\sigma$=the material conductivity in mho/m attenuation=exp$^{(-distance/\delta)}$ phase shift=cos($\omega$t+distance/$\delta$) expressed in radians The attenuation and phase shift of each sample were tested over a frequency range of 5 to 70 kHz.

Testing followed an iterative progression, where in each successive sample manufactured, modification of the composite tube properties were directed towards enhancing the electromagnetic transparency at 20 kHz. The first few iterative steps served as benchmarking the composite tube properties.

Table 8 shows the results of attenuation and phase shift testing conducted on the tube samples. The results are based on the individual response of each tube and are not normalized to a fixed working thickness. Table 9 presents the results after normalization to a working thickness of 2.5".

Figure 3:
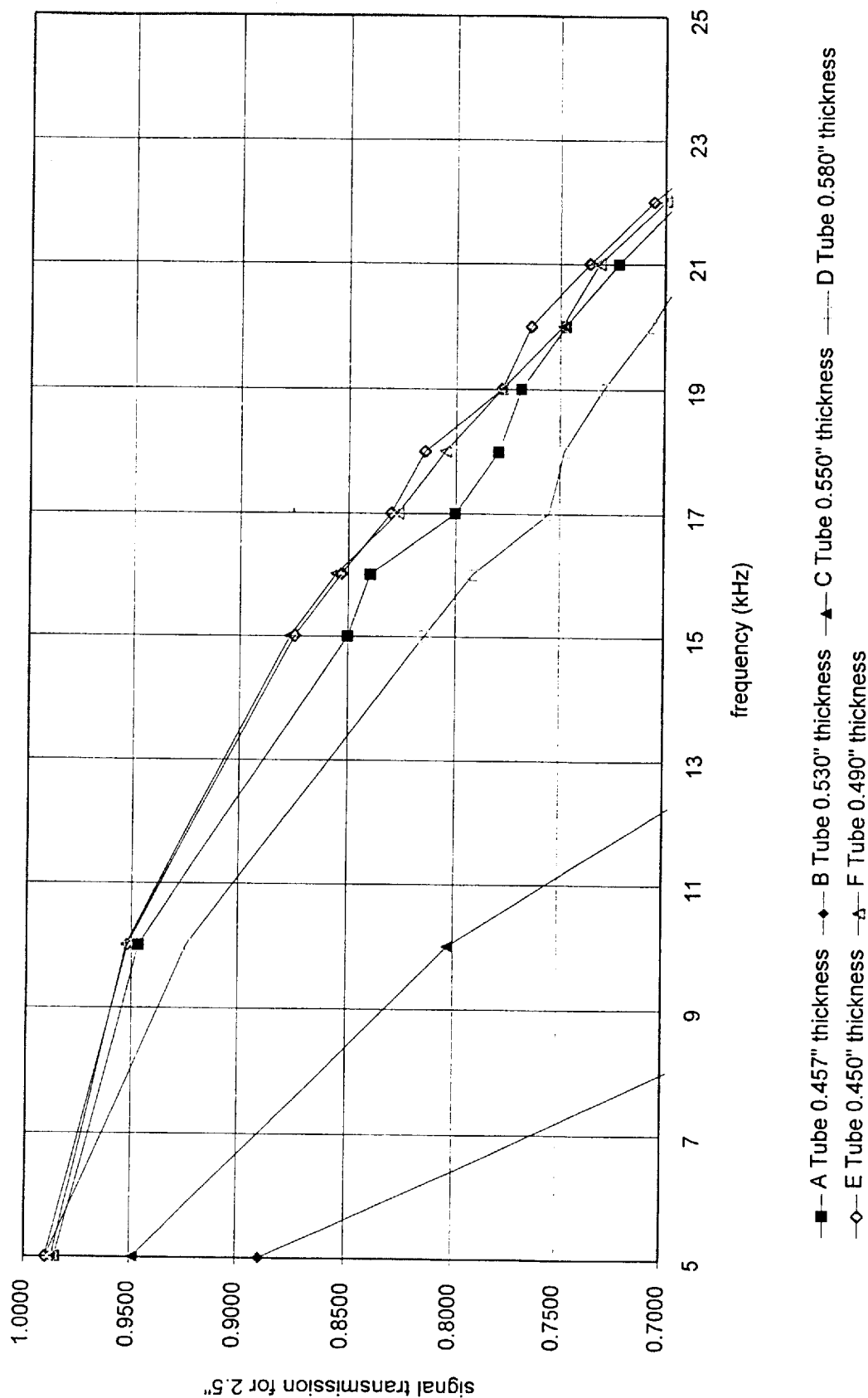
FIG. 3 is a close-up view of the graph of the results of FIG. 2 normalized to a 2.5" working thickness showing signal attenuation vs. frequency for basic composite tube samples on a linear x-y scale.
Figure 4:
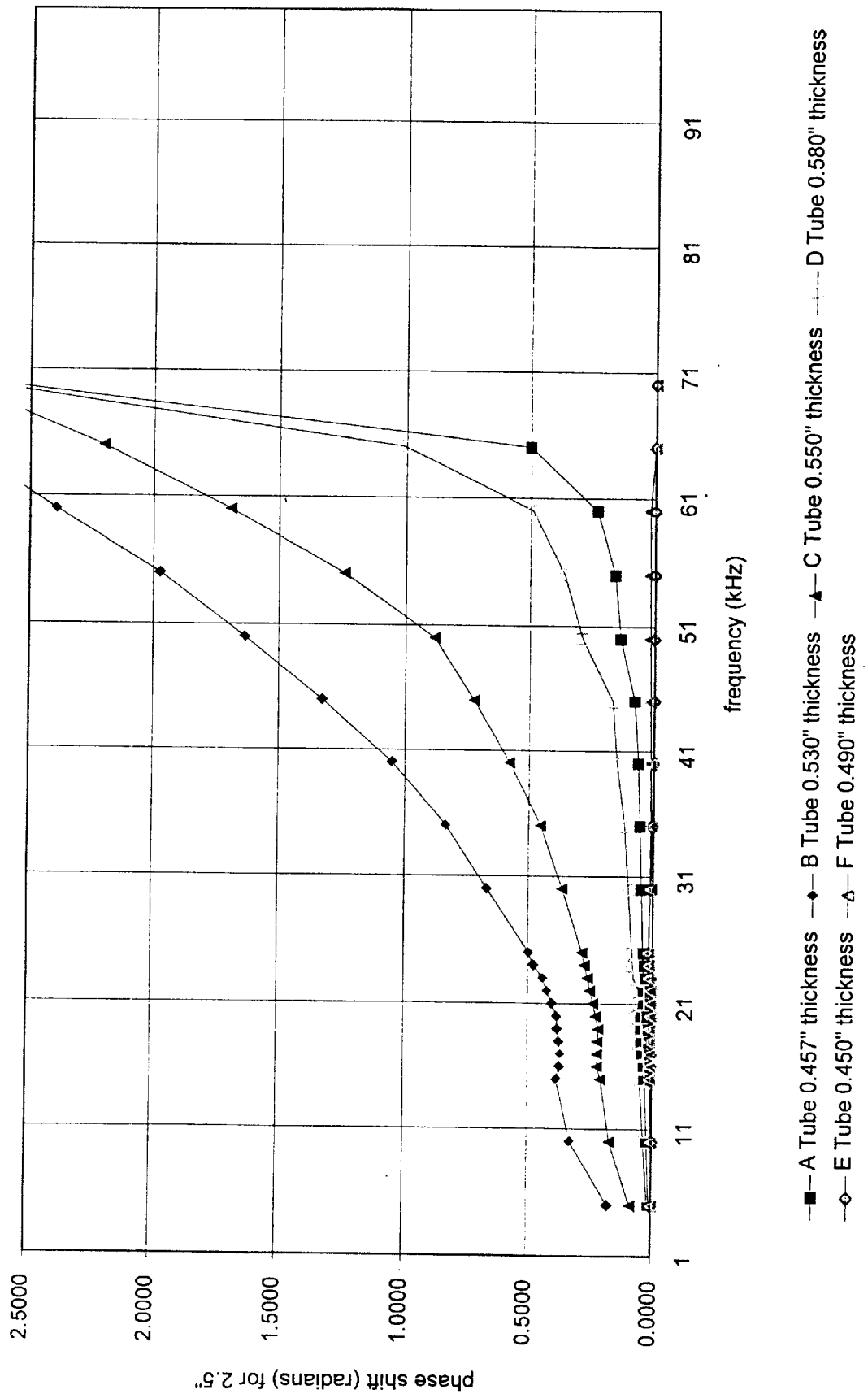
FIG. 4 is a graph of the results of FIG. 1 normalized to a 2.5" working thickness showing phase shift vs. frequency for basic composite tube samples on a linear x, log y scale.

FIGS. 1–4 are graphs of the results of attenuation and phase shift for the composite tube samples. FIGS. 3 and 4 show the results normalized to a working thickness of 2.5". FIG. 3 presents a close-up of the normalized attenuation results on a linear x-axis and linear y-axis scale.

Results

There are three main parameters in the tube composition under investigation:

1. carbon fibre coaxial alignment
2. percentage concentration of carbon fibre
3. contribution of resin to conductivity The results show that in the case of Tube Samples B & C, coaxial alignment has a major contribution in determining the response of a tube sample. From Table 9 at 20 kHz, the attenuation values are 0.1248 and 0.4834 respectively for Tube samples B and C. In Tube Sample D, the effect of coaxial alignment was minimized and the response improved to 0.7064.

Comparing the results of Tube Samples D, E & F, the reduction in carbon fibre percentage concentration improved the response from 0.7064 to 0.7639. Furthermore, the phase shift response for Tube Samples E & F indicate a dramatic change in phase behaviour over previous samples. This behaviour can be attributed to the expected nonlinear conductivity relationship with a minimum threshold carbon fibre percentage concentration demonstrating that the phase shift response is far more sensitive to this threshold than the amplitude response. In the case of the amplitude response, its insensitivity to the threshold is also moderated by the remnant contribution from the slight coaxial fibre alignment.

The near identical responses of tube Samples E & F indicate that the choice of resin system has a negligible contribution to the conductivity response.

Tube Sample G, with the percentage of carbon fibre reduced to 25% demonstrated an attenuation response of 0.7651 and had no effect on phase shift.

Composite Tube/End-fittings Junctions

Figure 6:
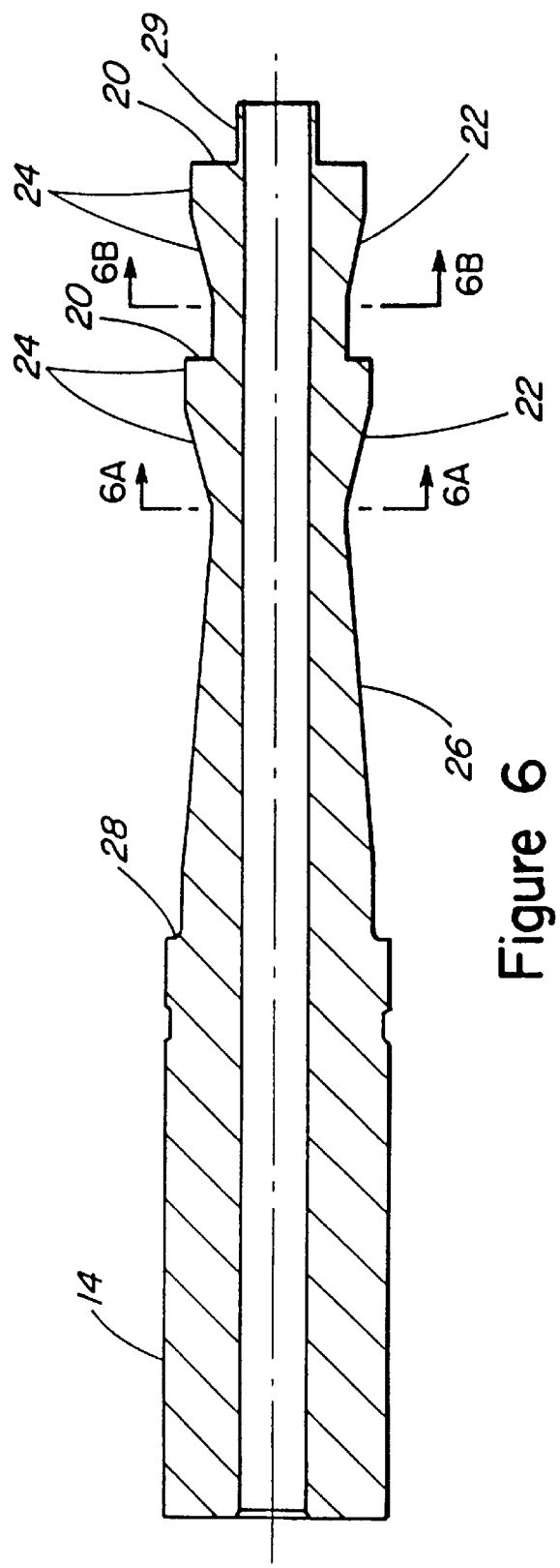
FIG. 6 is a cross-sectional drawing of an end-fitting in accordance with the invention.
Figure 7:
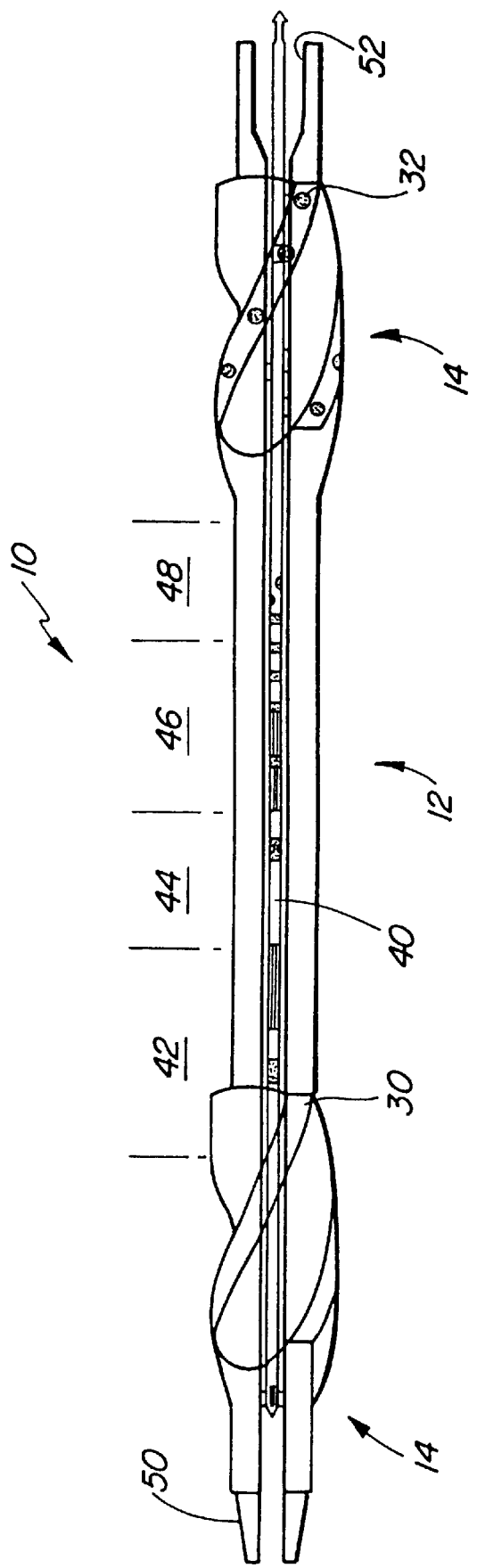
FIG. 7 is a wire-frame drawing of an assembled composite tube and end-fittings in accordance with the invention showing a logging tool within the body of the assembly.

In addition to the physical and electromagnetic properties of the composite tube, the composite tube must be readily integrated within an existing drillstring. Accordingly, the design incorporates a junction with end-fittings for integration of the composite tube to an existing drillstring as shown in FIGS. 5, 6, and 7.

Figure 5:
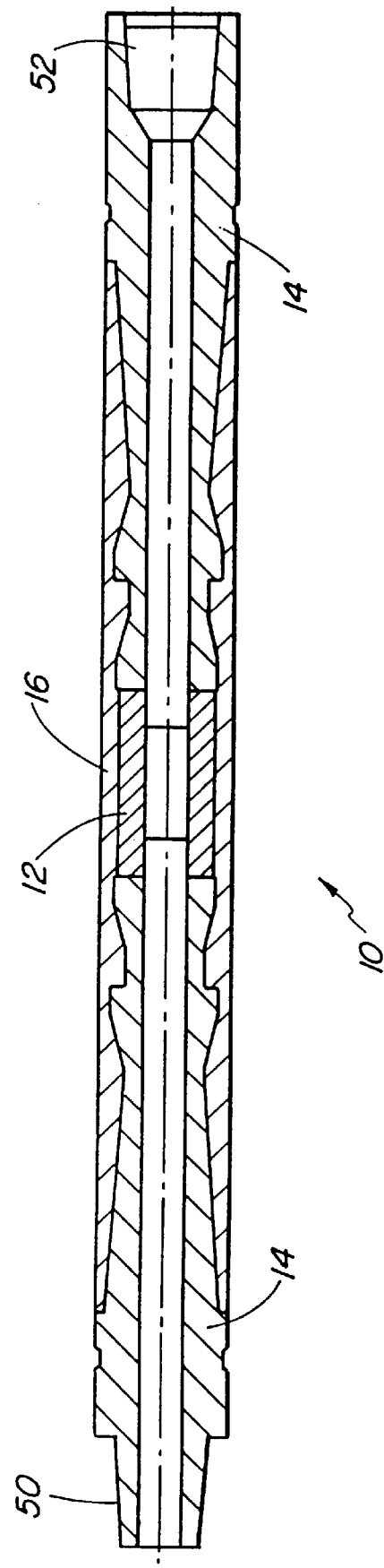
FIG. 5 is an assembly drawing of a composite tube and end-fittings in accordance with the invention.
Figure 6B:
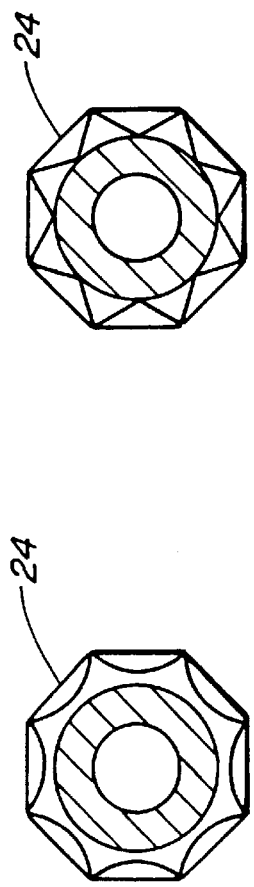
FIG. 6B is a cross-sectional drawing of the end-fitting of FIG. 6 at the line 6B—6B.
Figure 6A:
FIG. 6A is a cross-sectional drawing of the end-fitting of FIG. 6 at the line 6A—6A.
Figure 6C:
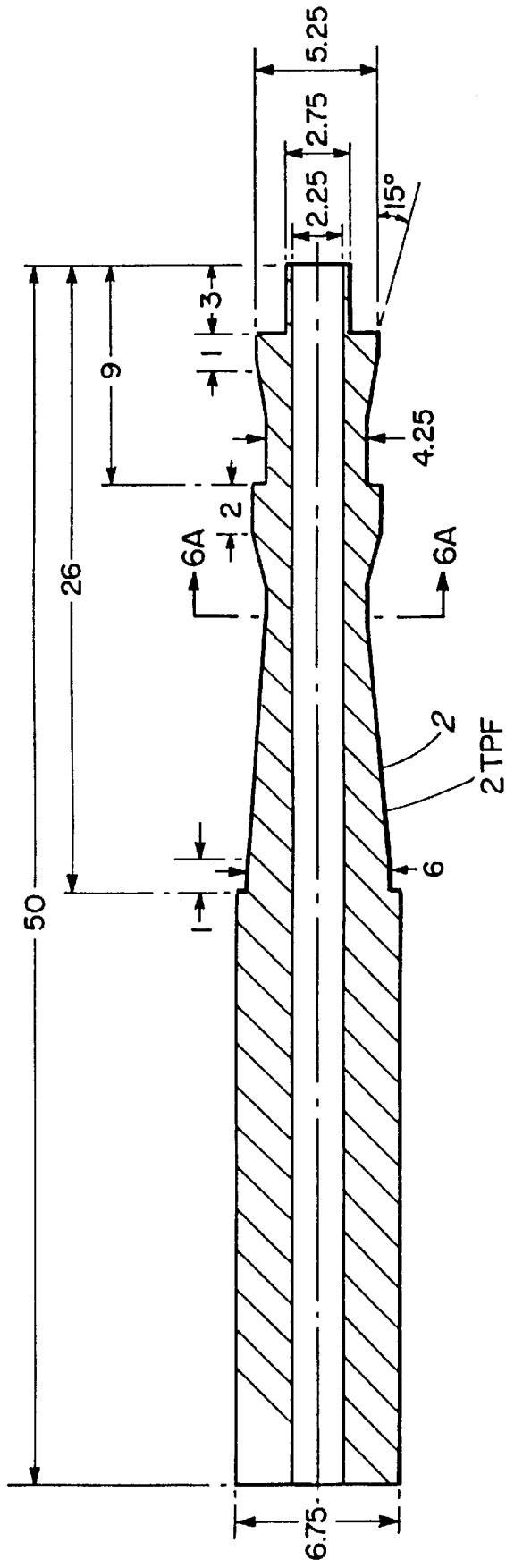
FIG. 6C is a cross-sectional drawing of the end-fitting of FIG. 6 showing preferred dimensions for a nominal 6¾–7 inch tool.

FIG. 5 is an assembly drawing of the composite tube and end-fittings in accordance with the invention showing the basic composite tube 12 assembled with the end-fittings 14. Outer wrapping 16 is shown connecting the basic composite tube 12 with the end-fittings 14. FIG. 6 is a cross-sectional drawing of an end-fitting showing details of the end-fittings. FIGS. 6A and 6B show details of the cross-sections of the end-fittings at lines 6A—6A and 6B—6B respectively. FIG. 6C shows the preferred dimensions of the end-fittings for integration with a drillstring. FIG. 7 is wire-frame drawing of an alternate embodiment of the assembled composite tube/end-fitting.

As for the design of the basic composite tube, the critical design issues for the end-fittings include body stiffness and strength in addition to load transfer between the composite body section and end-fittings.

In accordance with the invention, the junction is designed to provide separate load paths for the axial compression and tensile loads from the composite collar body to the end-fittings in order to avoid relying on a bonded joint to carry loads for the life of the fitting. The compression load is carried from the basic composite tube 12 directly against bearing surfaces 20, the axial tensile loads are carried against axial tension surfaces 22, the torsional forces are carried against the torsional transfer surfaces 24 and the bending stress forces are carried against the bending stress transfer surface 26.

The bending stress transfer surface 26 provides a section over which the bending load transfers from the end fitting 14 to the assembled composite tube 12,16. This surface is required to prevent rotational bending fatigue from occurring in the end fitting 14. Rotational bending fatigue is a major cause of failure in downhole tools. The bending stress transfer surface has a maximum diameter of 6.00 inches to maintain the strength required in the composite tube. This diameter is made as large as possible to minimize the bending stress at the shoulder 28. It has been shown that in order to prevent fatigue cracking, the minimum diameter of a reduced section of a drill collar is such that its moment of inertia (I) is no less than 29.5% of that calculated using the nominal O.D. of the drill collar. In this case, this minimum diameter is 5 inches. The 4.25 inch diameter shown is less than this 5 inch minimum and consequently this section of the end fitting cannot carry the full bending load. Accordingly, the bending stress transfer surface 26 is tapered at 2 inches per foot to allow the bending load to be transferred from the end fitting 14 to the assembled composite tube 12,16 prior to the 4.25 inch diameter.

The torsional transfer surfaces 24 provide a balance between the torsional capacity of the end fittings 14 and the assembled composite tube 12,16, thus maximizing the overall torsional capacity of the assembly 10. The 4.25 inch diameter is the minimum needed to meet the torsional requirements for the end fittings 14. Using this minimum diameter results in the maximum area available for the torsional transfer surfaces 24.

The axial tension surfaces are also provided with tapered surfaces 22.

It is preferred that the end fittings 14 be manufactured from non-magnetic material to facilitate MWD tools. However, they may be manufactured from AISI 4145H MOD if magnetic properties are not a concern.

Junction Theory and Design

As indicated, the metal/composite junction is designed to transfer torsion, axial compression, tensile and bending loads. The design and analysis of the end-fitting considered the following:

1. minimum thickness of metal required to carry load;
2. interface pressure for composite on the tapered section of the fitting; and,
3. kick-out load created by the tapered metal fitting.

Using an octahedral shearing stress criterion, the minimum diameter of the end-fitting was determined with the assumption that no yielding is permitted under the maximum loading environment. The minimum factor of safety used in the analysis was 1.0 as stresses are calculated for impact environment and maximum axial and torsion load are assumed to occur at the same time.

Octahedral Shearing Stress, Y $Y=\sqrt{(\sigma^2+3\tau^2)}$

Loading condition: 800,000 lb. axial and 600,000 lb.-in torque

Dimensions

Outside diameter=4.25 inches,
Inside diameter=2.25 inches $\sigma$=axial stress=load/area=800,000/10.2=78,350 psi
$\tau$=shear stress=T(OD/2J)=600,000(4.25)/2(29.5)=43,200 psi
$Y=\sqrt{(78,350^2+(3)43,200^2)}$=108,300 psi
Yield Strength (minimum)=110,000 psi
Factor of Safety=110,000/108,300=1.01

The design of the tapered section of the fitting was based on the concept described in "The NCF (No Cut Fibre) Coupling", W. Rumberger, B. Spencer, Presented at the American Helicopter Society Meeting On Composites, June, 1985, Stamford, Conn.

Figure 8:
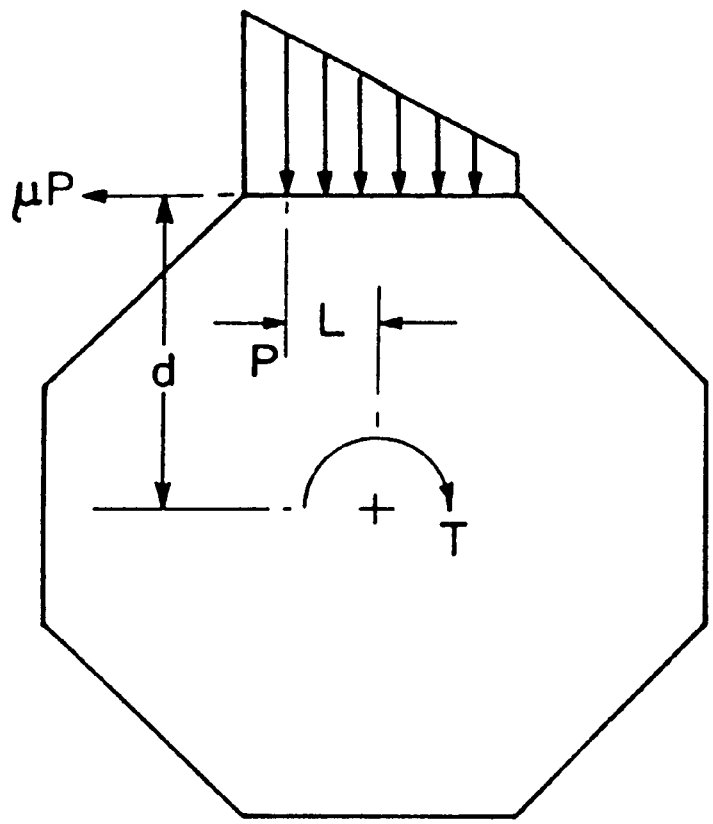
FIG. 8 is a torsion load free-body diagram for the design of the torque transfer surface(s).

FIG. 8 shows how the torsion load is reacted by the polygon shape on the end-fitting. A similar free body is used for the axial load except that the loading on the polygon surfaces is constant, not triangular, and both traps are used to react the axial tensile load.

T=(dμP+PL)F, where

T=Applied torque=600,000 lb.-in.

μ=Coefficient of Friction=0.2 d=2.367 inches (average)

L=0.327 inches (average)

F=number of flats=8

Solving for P

P=93,710 pounds

Using the force normal to the fitting tapered polygon section the composite bearing stress $\sigma_{BT}$ due to the torsion load can be calculated.

area of flat=5.76 in$^2$ $\sigma_{BT}$=93,710/5.76

$\sigma_{BT}$=16,270 psi

The bearing stress created by the tensile load on the drill collar is calculated next and added to the stresses determined above for the torsion load.

This analysis includes the additional area of the conical taper in the inboard trap. This trap was not included in the calculation for reacting the torsion load because it is not a polygon. Using a similar free body diagram as presented previously the bearing load on the flats and conical taper can be calculated for the 800,000 pound axial load as shown below.

$\sigma_{BA}$=load/area area of flats=(8) 5.76 in$^2$=46.08 in$^2$ area of conical taper=28.83 in$^2$ total area=74.91 normal load=800,000/sin15 pounds $\sigma_{BA}$=800,000/(sin15)(74.91)

$\sigma_{BA}$=41,260 psi

The total bearing stress on the tapered sections of the fitting are;

Tapered polygon bearing stress=16,270+41,260=57,530 psi

Conical inside taper bearing stress=41,260 psi

The ultimate bearing strength is 60 ksi. Since the calculated bearing stress is created by an impact load the margin is considered adequate even taking into account possible uneven load share between the two tapered sections.

Next, using the normal load the kick out load can be calculated for both the axial and torsion loads combined.

Total kick out load, KL

KL=F*Pcos15+Tensile Load/tan15=8(93,710)cos15+800,000/tan15

KL=3,710,000 pounds

Using an allowable tensile stress of 525 ksi (0.75×700 ksi) for the carbon fibre, the required area of hoop fibre to react the kick out load can be calculated as follows.

area=3,710,000/525,000 area=7.07 in$^2$

The fitting is designed to allow for adequate hoop fibre.

To improve load transfer and reduce stress concentrations, the hoop fibre is interspersed with the helical wound fibre.

The last load condition to consider is the compressive load. When only considering the area of composite adjacent to the end of the metal fitting to transfer the compressive load, the resulting bearing stress can be calculated as presented below:

$\sigma_B$=load/area=300,000($\pi$/4*(5.25$^2$−2.50$^2$))

$\sigma_B$=17,900 psi

As stated above the ultimate is 60 ksi.

The stress analysis shows that the drill collar is properly designed for all loading conditions.

Manufacture of the Composite Tube with Integral End-fittings Manufacture of the assembly 10 is achieved in accordance with the following general methodology. It is understood that within the context of the invention, various fibre types, fibre orientation and resin systems may be employed for the particulars of a design.

Following construction and cutting to length of the basic inner tube 12,

1. A metal rod is placed within the basic composite tube and end-fittings 14 are placed over the metal rod. Flange 29 is inserted within each end of the basic composite tube 12.

2. End plates are attached to the metal rod to lock the basic composite tube 12 and end-fittings 14 together for placement on a filament winder;

3. The outer surface of the composite tube 12 and the axial tension 22, torsional transfer 24 and bending stress transfer surfaces 26 of the end-fittings 14 are filament wound with resin impregnated fibre with a combination of helical and hoop wound fibre to an outside diameter corresponding to that of the outside diameter of the end-fittings 14.

Other Design Considerations

Following completion of the filament winding, an abrasion resistant coating may be added after curing of the assembly. The abrasion resistant coating is preferably a wear-resistant trowelable coating such as ARMORSTONE CERATROWEL (ceramic powder filled epoxy) CeraTrowel from DuraWear Corporation.

A stabilizer wear pad 30 may be used either on the end-fittings 14 or on the composite body 16 in order to minimize the wear to the composite material. The stabilizer wear pad 30 may also include additional sensing elements such as rutile focussing lenses 32 as shown in FIG. 7 for use with micro-pulse imaging radar equipment. Stabilizers 30 may be integral or removable from the assembly 10. FIG. 7 also shows a logging tool 40 within the bore of the assembly 10. Examples of typical sensing equipment such as a neutron source and detector 42, gamma ray detector 44, resistivity component 46 and acoustic ranging equipment 48 are also shown. The ends of the assembly 10 are shown with respective threaded surfaces 50 and 52 for integration of the end-fittings 14 with a drillstring.

Furthermore, a resin including an amount of ceramic powder blended into the resin is contemplated to enhance the wear properties of the composite material.

Sealing of the metal/composite junction can also be implemented on a number of the junction surfaces using gaskets and/or o-rings without affecting the function of the surfaces.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the claims.

TABLE 1

Required Performance Characteristics (nominal 6 ¾" diameter tool only)

| | |
|---|---|
| tensile load, max | 200,000 lb. static |
| | 800,000 lb. impact |
| compressive load, max | 50,000 lb. static |
| | 300,000 lb. impact |
| torsion load, max | 50,000 ft-lb. |
| internal pressure, max | 3,000 psi |
| endurance limit | 75,000 psi |
| lateral stiffness, min | 70% of steel drill collar |
| impact strength, min | 40 ft-lb charpy v-notch at ambient temp. |
| tensile strength, min | 120,000 psi |
| yield strength, min | 110,000 psi |
| physical dimensions, OD, max | 7.25 inches |
| ID, min | 2.25 inches |
| overall length | 7–31 feet |
| operating temperature, max | 300° F. |

TABLE 2

Baseline Composite Tube

| Material | Angle | % Thickness |
|---|---|---|
| HR40 Carbon Fibre | 10° | 36 |
| KEVLAR 149 | 10° | 40 |
| S-2 Glass | 10° | 14 |
| S-2 Glass | 90° | 10 |

TABLE 3

Fibre Properties

| Type | Manufacturer | Tensile Modulus, msi | Tensile Strength, ksi |
|---|---|---|---|
| HR40 Carbon | Grafil, Inc. | 55.3 | 700 |
| KEVLAR 149 | DuPont | 26.0 | 500 |
| S-2 Glass | Owens-Corning | 12.5 | 530 |

TABLE 4

Material Properties of the Composite Body

| | |
|---|---|
| Axial Modulus | 17.8 msi |
| Hoop Modulus | 1.81 msi |
| Shear Modulus | 1.09 msi |
| Poisson's ratio, AH | 0.47 |
| Poisson's ratio, HA | 0.048 |

TABLE 5

COMPOSITE DESIGN ALLOWABLES

| | HR40 | Kevlar 149 | S-2 Glass |
|---|---|---|---|
| Tensile strength fibre direction, ksi | 210 | 200 | 200 |
| Transverse tensile strength, ksi | 6 | 4 | 6 |
| Compressive strength fibre direction, ksi | 100 | 60 | 100 |
| Transverse compressive strength, ksi | 30 | 30 | 30 |
| Shear strength, ksi | 9 | 3 | 9 |
| Bearing ultimate strength, ksi | 60 | 60 | 60 |

TABLE 6

SUMMARY OF STRESSES

| | HR40 | KEVLAR 149 | S-2 |
|---|---|---|---|
| 10° Layers | | | |
| Tensile stress, fibre direction/allowable, ksi | 120/210 | 57.4/200 | 27.4/200 |
| Tensile stress, transverse direction/allowable, ksi | 1/6 | .6/4 | 1.3/6 |
| Compressive stress, fibre direction/allowable, ksi | 0/100 | 0/60 | 0/100 |
| Compressive stress, transverse direction/allowable, ksi | 2/30 | .8/30 | .3/30 |
| Shear stress/allowable, ksi | 6.8/9 | 2.4/3 | 8.8/9 |
| 90° Layers | | | |
| Tensile stress, fibre direction/allowable, ksi | | | 0/200 |
| Tensile stress, transverse direction/allowable, ksi | | | 3.7/6 |
| Compressive stress, fibre direction/allowable, ksi | | | 7.2/100 |
| Compressive stress, transverse direction/allowable, ksi | | | 0/30 |
| Shear stress/allowable, ksi | | | 8.3/9 |

TABLE 7

Composite Tube Sample Construction: Attenuation and Phase Shift Data

| Sample Designation | Significant Parameter | Formulation Carbon Fibre | Formulation S-Glass | Formulation Kevlar | Fibre Orientation Degree | Attenuation @ 20 kHz | Signal Phase Shift @ 10 kHz Radians | Signal Phase Shift @ 20 kHz Radians | Signal Phase Shift @ 70 kHz Radians |
|---|---|---|---|---|---|---|---|---|---|
| A | GRAFIL HR-40 | 100% | 0% | 0% | 45 | 74.73% | 0.0192 | 0.0384 | 2.691 |
| B | GRAFIL 55-500 | 75% | 25% | 0% | 90 | 12.48% | 0.3269 | 0.3827 | 2.6233 |
| C | GRAFIL 55-500 | 55% | 45% | 0% | 90 | 48.34 | 0.1691 | 0.2255 | 2.8195 |
| D | New Resin | 73% | 27% | 0% | 10 | 70.64% | 0.0327 | 0.0655 | 2.7490 |
| E | Old Resin | 50% | 50% | 0% | 10 | 76.39% | 0.0000 | 0.0061 | 0.0000 |
| F | New Resin | 50% | 50% | 0% | 10 | 74.88 | 0.0031 | 0.0062 | 0.0000 |
| G | Kevlar | 25% | 10% | 65% | 10 | 76.51% | 0.0000 | 0.0000 | 0.0000 |

TABLE 8

Attenuation and Phase Shift Results
(not normalized)

| Frequency | Tube Sample #1 | | Tube Sample #2 | | Tube Sample #3 | | Tube Sample #4 | | Tube Sample #5 | | Tube Sample #6 | | Tube Sample #7 | |
|---|---|---|---|---|---|---|---|---|---|---|---|---|---|---|
| kHz | A amp | A phase | B amp | B phase | C amp | C phase | D amp | D phase | E amp | E phase | F amp | F phase | G amp | G phase |
| 5 | 0.9968 | 0.0079 | 0.9748 | 0.1382 | 0.9882 | 0.0660 | 0.9976 | 0.0126 | 0.9978 | 0.0000 | 0.9971 | 0.0000 | 0.9977 | 0.0000 |
| 10 | 0.9882 | 0.0157 | 0.9025 | 0.2576 | 0.9548 | 0.1319 | 0.9824 | 0.0251 | 0.9894 | 0.0000 | 0.9894 | 0.0025 | 0.9890 | 0.0000 |
| 15 | 0.9669 | 0.0236 | 0.8134 | 0.3016 | 0.9008 | 0.1602 | 0.9570 | 0.0377 | 0.9724 | 0.0075 | 0.9724 | 0.0075 | 0.9738 | 0.0000 |
| 16 | 0.9646 | 0.0251 | 0.8043 | 0.2915 | 0.8939 | 0.1709 | 0.9517 | 0.0402 | 0.9677 | 0.0040 | 0.9677 | 0.0080 | 0.9694 | 0.0000 |
| 17 | 0.9559 | 0.0320 | 0.7994 | 0.2884 | 0.8904 | 0.1709 | 0.9432 | 0.0427 | 0.9626 | 0.0043 | 0.9613 | 0.0086 | 0.9641 | 0.0000 |
| 18 | 0.9513 | 0.0339 | 0.7995 | 0.2941 | 0.8862 | 0.1696 | 0.9415 | 0.0452 | 0.9592 | 0.0090 | 0.9564 | 0.0090 | 0.9590 | 0.0000 |
| 19 | 0.9489 | 0.0358 | 0.7994 | 0.2985 | 0.8830 | 0.1671 | 0.9372 | 0.0478 | 0.9511 | 0.0096 | 0.9503 | 0.0096 | 0.9512 | 0.0000 |
| 20 | 0.9442 | 0.0314 | 0.8010 | 0.3016 | 0.8816 | 0.1759 | 0.9319 | 0.0503 | 0.9480 | 0.0050 | 0.9438 | 0.0050 | 0.9469 | 0.0000 |
| 21 | 0.9386 | 0.0264 | 0.8045 | 0.3167 | 0.8827 | 0.1847 | 0.9275 | 0.0396 | 0.9418 | 0.0053 | 0.9399 | 0.0053 | 0.9416 | 0.0000 |
| 22 | 0.9322 | 0.0276 | 0.8061 | 0.3318 | 0.8799 | 0.1935 | 0.9213 | 0.0415 | 0.9351 | 0.0055 | 0.9328 | 0.0055 | 0.9348 | 0.0000 |
| 23 | 0.9231 | 0.0289 | 0.8077 | 0.3468 | 0.8787 | 0.2023 | 0.9165 | 0.0578 | 0.9275 | 0.0058 | 0.9282 | 0.0116 | 0.9270 | 0.0000 |
| 24 | 0.9183 | 0.0302 | 0.8034 | 0.3770 | 0.8725 | 0.2111 | 0.9100 | 0.0603 | 0.9200 | 0.0121 | 0.9227 | 0.0121 | 0.9233 | 0.0000 |
| 25 | 0.9076 | 0.0314 | 0.8044 | 0.3927 | 0.8712 | 0.2199 | 0.9042 | 0.0628 | 0.9199 | 0.0126 | 0.9164 | 0.0126 | 0.9160 | 0.0000 |
| 30 | 0.8824 | 0.0377 | 0.7801 | 0.5278 | 0.8422 | 0.2827 | 0.8687 | 0.0754 | 0.8765 | 0.0075 | 0.8785 | 0.0675 | 0.8785 | 0.0000 |
| 35 | 0.8291 | 0.0440 | 0.7312 | 0.6597 | 0.8002 | 0.3519 | 0.8254 | 0.0880 | 0.8383 | 0.0044 | 0.8347 | 0.0088 | 0.8333 | 0.0000 |
| 40 | 0.7758 | 0.0503 | 0.6895 | 0.8294 | 0.7474 | 0.4524 | 0.7654 | 0.1131 | 0.7789 | 0.0025 | 0.7753 | 0.0101 | 0.7754 | 0.0000 |
| 45 | 0.6861 | 0.0636 | 0.6378 | 1.0462 | 0.6831 | 0.5655 | 0.6839 | 0.1272 | 0.7150 | 0.0000 | 0.6921 | 0.0113 | 0.6963 | 0.0000 |
| 50 | 0.5734 | 0.1100 | 0.5927 | 1.2881 | 0.5949 | 0.6912 | 0.5248 | 0.2189 | 0.5747 | 0.0000 | 0.5874 | 0.0126 | 0.5845 | 0.0000 |
| 55 | 0.3734 | 0.1296 | 0.5709 | 1.5551 | 0.4800 | 0.9676 | 0.3657 | 0.2765 | 0.4491 | 0.0000 | 0.4073 | 0.0138 | 0.4037 | 0.0000 |
| 60 | 0.0921 | 0.1885 | 0.5969 | 1.8850 | 0.3504 | 1.3195 | 0.0464 | 0.3770 | 0.0842 | 0.0000 | 0.1020 | 0.0151 | 0.1266 | 0.0000 |
| 65 | 0.0120 | 0.4084 | 0.5871 | 2.2054 | 0.2289 | 1.7153 | 0.0189 | 0.7760 | 0.0159 | 0.0000 | 0.0159 | 0.0000 | 0.0207 | 0.0000 |
| 70 | 0.0220 | 2.1991 | 0.5796 | 2.0672 | 0.1064 | 2.1991 | 0.0323 | 2.1112 | 0.0309 | 0.0000 | 0.0309 | 0.0000 | 0.0333 | 0.0000 |
| Composition Parameter Tested | 100% HR-40 carbon reference sample | | 75% GRAFIL carbon varying of carbon fibre content + exclusive circumferential carbon fibre wraps | | 50% GRAFIL carbon | | 75% GRAFIL carbon minimize circumferential carbon fibre wraps | | 50% GRAFIL carbon tubes of differing resin dielectric properties + parameter of Tube Sample #4 with reduced carbon fibre content | | 50% GRAFIL carbon | | 25% GRAFIL carbon GRAFIL reduced to 25% by replacing with Kevlar fibre | |

TABLE 9

Attenuation and Phase Shift Test Results
(normalized to a 2.5" working thickness)

| Frequency | Tube Sample #1 | | Tube Sample #2 | | Tube Sample #3 | | Tube Sample #4 | | Tube Sample #5 | | Tube Sample #6 | | Tube Sample #7 | |
|---|---|---|---|---|---|---|---|---|---|---|---|---|---|---|
| kHz | A amp | A phase | B amp | B phase | C amp | C phase | D amp | D phase | E amp | E phase | F amp | F phase | G amp | G phase |
| 5 | 0.9855 | 0.0097 | 0.8892 | 0.1754 | 0.9485 | 0.0846 | 0.9897 | 0.0164 | 0.9900 | 0.0000 | 0.9870 | 0.0000 | 0.9898 | 0.0000 |
| 10 | 0.9466 | 0.0192 | 0.5712 | 0.3269 | 0.8028 | 0.1691 | 0.9241 | 0.0327 | 0.9519 | 0.0000 | 0.9526 | 0.0031 | 0.9513 | 0.0000 |
| 15 | 0.8501 | 0.0289 | 0.1793 | 0.3827 | 0.5672 | 0.2054 | 0.8146 | 0.0491 | 0.8747 | 0.0091 | 0.8767 | 0.0093 | 0.8841 | 0.0000 |
| 16 | 0.8397 | 0.0307 | 0.1393 | 0.3699 | 0.5371 | 0.2191 | 0.7918 | 0.0523 | 0.8533 | 0.0049 | 0.8557 | 0.0100 | 0.8646 | 0.0000 |
| 17 | 0.8003 | 0.0392 | 0.1178 | 0.3660 | 0.5218 | 0.2191 | 0.7551 | 0.0556 | 0.8302 | 0.0052 | 0.8271 | 0.0107 | 0.8412 | 0.0000 |
| 18 | 0.7795 | 0.0415 | 0.1182 | 0.3732 | 0.5035 | 0.2174 | 0.7478 | 0.0589 | 0.8147 | 0.0110 | 0.8052 | 0.0112 | 0.8188 | 0.0000 |
| 19 | 0.7686 | 0.0438 | 0.1178 | 0.3788 | 0.4895 | 0.2142 | 0.7291 | 0.0622 | 0.7779 | 0.0117 | 0.7779 | 0.0119 | 0.7841 | 0.0000 |
| 20 | 0.7473 | 0.0384 | 0.1248 | 0.3827 | 0.4834 | 0.2255 | 0.7064 | 0.0655 | 0.7639 | 0.0061 | 0.7488 | 0.0062 | 0.7651 | 0.00DO |
| 21 | 0.7220 | 0.0323 | 0.1402 | 0.4019 | 0.4882 | 0.2368 | 0.6875 | 0.0516 | 0.7357 | 0.0065 | 0.7314 | 0.0066 | 0.7416 | 0.0000 |
| 22 | 0.6930 | 0.0338 | 0.1472 | 0.4211 | 0.4760 | 0.2481 | 0.6607 | 0.0540 | 0.7053 | 0.0067 | 0.6997 | 0.0068 | 0.7115 | 0.0000 |
| 23 | 0.6518 | 0.0354 | 0.1543 | 0.4401 | 0.4708 | 0.2594 | 0.6400 | 0.0753 | 0.6708 | 0.0071 | 0.6791 | 0.0144 | 0.6770 | 0.0000 |
| 24 | 0.6300 | 0.0370 | 0.1354 | 0.4784 | 0.4437 | 0.2707 | 0.6120 | 0.0785 | 0.6367 | 0.0148 | 0.6546 | 0.0150 | 0.6606 | 0.0000 |
| 25 | 0.5816 | 0.0384 | 0.1398 | 0.4983 | 0.4381 | 0.2819 | 0.5870 | 0.0818 | 0.6363 | 0.0154 | 0.6264 | 0.0157 | 0.6283 | 0.0000 |
| 30 | 0.4675 | 0.0461 | 0.0329 | 0.6698 | 0.3115 | 0.3624 | 0.4340 | 0.0982 | 0.4392 | 0.0091 | 0.4570 | 0.0093 | 0.4624 | 0.0000 |
| 35 | 0.2261 | 0.0538 | 0.0000 | 0.8372 | 0.1283 | 0.4512 | 0.2473 | 0.1146 | 0.2657 | 0.0054 | 0.2613 | 0.0109 | 0.2624 | 0.0000 |
| 40 | 0.0000 | 0.0616 | 0.0000 | 1.0525 | 0.0000 | 0.5800 | 0.0000 | 0.1473 | 0.0000 | 0.0030 | 0.0000 | 0.0126 | 0.0063 | 0.0000 |
| 45 | 0.0000 | 0.0778 | 0.0000 | 1.3276 | 0.0000 | 0.7250 | 0.0000 | 0.1656 | 0.0000 | 0.0000 | 0.0000 | 0.0141 | 0.0000 | 0.0000 |
| 50 | 0.0000 | 0.1346 | 0.0000 | 1.6346 | 0.0000 | 0.8862 | 0.0000 | 0.2863 | 0.0000 | 0.0000 | 0.0000 | 0.0157 | 0 0000 | 0 0000 |
| 55 | 0.0000 | 0.1586 | 0.0000 | 1.9734 | 0.0000 | 1.2406 | 0.0000 | 0.3600 | 0.0000 | 0.0000 | 0.0000 | 0.0172 | 0.0000 | 0.0000 |
| 60 | 0.0000 | 0.2307 | 0.0000 | 2.3921 | 0.0000 | 1.6917 | 0.0000 | 0.4909 | 0.0000 | 0.0000 | 0.0000 | 0.0188 | 0.0000 | 0.0000 |
| 65 | 0.0000 | 0.4998 | 0.0000 | 2.7987 | 0.0000 | 2.1992 | 0.0000 | 1.0104 | 0.0000 | 0.0000 | 0.0000 | 0.0000 | 0.0000 | 0.0000 |
| 70 | 0.0000 | 2.6910 | 0.0000 | 2.6233 | 0.0000 | 2.8195 | 0.0000 | 2.7490 | 0.0000 | 0.0000 | 0.0000 | 0.0000 | 0.0000 | 0.0000 |
| Composition Parameter Tested | 100% HR-40 carbon reference sample | | 75% GRAFIL carbon varying of carbon fibre content + exclusive circumferential carbon fibre wraps | | 55% GRAFIL carbon | | 75% GRAFIL carbon minimize circumferential carbon fibre wraps | | 50% GRAFIL carbon tubes of differing resin dielectric properties + parameter of Tube Sample #4 with reduced carbon fibre content | | 50% GRAFIL carbon | | 25% GRAFIL carbon GRAFIL reduced to 25% by replacing with Kevlar fibre | |

The embodiments of the invention in which an exclusive property or privilege is claimed are defined as follows:

1. A composite body having signal attenuation properties for a physical and performance design point, the composite body comprising a plurality of fibre layers impregnated with a resin, wherein the composite body has a longitudinal axis and the fibre layers include at least one layer of carbon fibre generally oriented with the longitudinal axis to minimize signal attenuation and wherein each fibre layer is selected in accordance with desired mechanical, signal attenuation and phase shift properties of the design point.

2. A composite body as in claim 1 wherein the resin is an epoxy resin.

3. A composite body as in claim 2 wherein the epoxy resin is a selected from any one of a cyanate ester resin or a bisphenol F epoxy resin.

4. A drill string component comprising a basic composite tube as in claim 1 with integral end-fittings, the end-fittings including:

a tube seat for seating the end-fittings within the basic composite tube;

at least one compression bearing surface for supporting a compression load between the end-fittings and the basic composite tube;

at least one torsional transfer surface for transferring torsional load between the end-fittings and the basic composite tube;

at least one bending stress transfer surface for supporting a bending stress load between the end-fittings and basic composite tube;

at least one axial tension surface for supporting an axial tension load between the end-fittings and basic composite tube.

5. A drill string component as in claim 4 wherein the at least one torsional transfer surface comprises multiple surfaces.

6. A drill string component as in claim 5 wherein the at least one torsional transfer surface comprises eight surfaces.

7. A drill string component as in claim 6 wherein each of the eight surfaces are parallel to the longitudinal axis of the end-fittings.

8. A drill string component as in claim 6 wherein each of the eight surfaces are tapered with respect to the longitudinal axis of the end-fittings.

9. A drill string component as in claim 6 wherein the multiple surfaces are a combination of both tapered and parallel surfaces with respect to the longitudinal axis of the end-fittings.

10. A drill string component as in claim 4 wherein the end-fittings are attached to the basic composite tube by additional winding of resin-impregnated fibre.

11. A drill string component as in claim 10 wherein the additional winding is high modulus glass fibre wound at 90° with respect to the longitudinal axis of the end-fittings.

12. A drill string component as in claim 4 wherein the end-fittings further comprise stabilizers.

13. A drill string component as in claim 12 wherein the stabilizers include rutile or zirconium focussing lenses for use with micro pulse imaging radar.

14. A drill string component as in claim 4 wherein the end-fittings are manufactured from AISI 4145H MOD steel.

15. A drill string component as in claim 4 wherein the end-fittings are manufactured from non-magnetic material.

16. A composite body as in claim 1 wherein the fibre layers include any one of or a combination of fibreglass and aramid fibres.

17. A composite body as in claim 16, wherein the composite body is a tube and the carbon fibre is oriented at ±10° with respect to the longitudinal axis.

18. A composite body as in claim 16 wherein the carbon fibre is a high modulus carbon fibre.

19. A composite body as in claim 16 wherein the fibre is selected from any one of or a combination of a fibreglass fibre comprising (1) 52–56 wt % silicon dioxide (silica), 16–25 wt % calcium oxide, 12–16 wt % aluminum oxide, 5–10 wt % boron oxide, 0–5 wt % magnesium oxide, 0–2 wt % sodium, potassium oxides, 0–0.8 wt % titanium oxide, 0.05–0.4 wt % iron oxide and 0–1.0 wt % fluorine, or (2) 65 wt % silicon oxide (silica), 25 wt % aluminum oxide and 10 wt % magnesium oxide or alumina-boria-silica ceramic fibres.

20. A composite body as in claim 16 wherein the aramid fibre is a high strength aramid fibre.

21. A composite body as in claim 16 wherein the composite body is a tube adapted for data acquisition from a wellbore, the composite tube having a signal transparency allowing the use of data acquisition equipment from within the tube, the data acquisition equipment selected from any one of or a combination of gamma ray emitters and sensors, neutron emitters and sensors, acoustic emitters and receivers, inductive EM emitters and receivers, and directional sensing equipment.

22. A composite tube for use in a drill string comprising a plurality of resin-impregnated fibre layers of a first type and a second type wherein the first type layers are interspersed by layers of the second type, the composite tube adapted for receiving a logging tool wherein the first layer type includes high modulus carbon fibre generally oriented with the longitudinal axis of the tube.

23. A composite tube as in claim 22 wherein the first layer type is wound at ±10° with respect to the longitudinal axis of the tube.

24. A composite tube as in claim 22 wherein the second layer type is wound at 90° with respect to the longitudinal axis of the tube, the second type comprising 100% high strength fibreglass.

25. A composite tube as in claim 22 wherein the first layer type constitutes 90% of the total wall thickness of the tube.

26. A composite tube as in claim 22 wherein the second layer type is equally interspersed through the tube wall at 1–9 discrete radial positions.

27. A composite tube as in claim 22 wherein the first layer type is wound at ±10° with respect to the longitudinal axis of the tube, the first layer type comprising 25% high modulus carbon fibre, 25% aramid fibre and 50% high strength fibre glass.

28. A composite tube as in claim 22 having a signal attenuation response of at least 70% at 20 kHz.

29. A composite tube as in claim 22 wherein the composite tube has microstructure with a fibre volume fraction of 60%.

30. A composite tube as in claim 22 wherein the tube is 7–31 feet long.

31. A composite tube as in claim 22 wherein the composite tube has performance standards including tensile load, compressive load, torsional load, internal pressure, endurance limit, lateral stiffness, impact strength, tensile strength, and yield strength which meet or exceed the standards of the American Petroleum Institute Specification 7.

32. A composite tube as in claim 22 further comprising an abrasion resistant coating on the outer surface of the tube.

33. A composite tube as in claim 32 wherein the abrasion resistant coating is a ceramic powder filled epoxy.

34. A composite tube as in claim 22 wherein the resin-impregnated fibre layers include a ceramic powder blended with the resin.

35. A composite tube as in claim 22 further comprising end-fittings integrally attached to the composite tube by additional fibre layers and resin.

36. A composite tube as in claim 22 wherein the first layer type includes 25–50% high modulus carbon fibre, 0–44% aramid fibre and 16–50% high strength fibre glass.

37. A drillstring component having a composite tube middle section with integral end-fittings, the composite tube middle section having an signal transparency comprising:

a basic composite tube, the basic composite tube including a plurality of resin-impregnated fibre layers of a first and second type wherein the first type layers are interspersed by layers of the second type and the first layers are wound at ±10° with respect to the longitudinal axis of the tube, the first layer type comprising 40% high modulus carbon fibre, 44% aramid fibre and 16% high strength fibre glass and the first layer constitutes 90% of the total wall thickness of the tube and wherein the second layer type is wound at 90° with respect to the longitudinal axis of the tube, the second type comprising 100% high strength fibre glass equally interspersed through the tube wall at a plurality of discrete radial positions; end-fittings, the end-fittings including:

a tube seat for seating the end-fitting within a basic composite tube;

at least one compression bearing surface for supporting a compression load between the end-fittings and the basic composite tube;

at least one torsional transfer surface for transferring torsional load between the end-fittings and the composite basic tube;

at least one bending stress transfer surface for supporting a bending stress load between the end-fittings and basic composite tube;

at least one axial tension surface for supporting an axial tension load between the end-fittings and basic composite tube.

38. An end-fitting for configuration to a composite tube comprising:

a tube seat for seating the end-fitting within the composite tube;

at least one compression bearing surface for supporting a compression load between the end-fittings and the composite tube;

at least one torsional transfer surface for transferring torsional load between the end-fittings and the composite tube;

at least one bending stress transfer surface for supporting a bending stress load between the end-fittings and composite tube;

at least one axial tension surface for supporting an axial tension load between the end-fittings and composite tube.

39. An end-fitting as in claim 38 wherein the at least one torsional transfer surface comprises multiple surfaces.

40. An end-fitting as in claim 39 wherein the at least one torsional transfer surface comprises eight surfaces.

41. An end-fitting as in claim 40 wherein each of the eight surfaces are parallel to the longitudinal axis of the end-fittings.

42. An end-fitting as in claim 40 wherein each of the eight surfaces are tapered with respect to the longitudinal axis of the end-fittings.

43. An end-fitting as in claim 40 wherein the multiple surfaces are a combination of both tapered and parallel surfaces with respect to the longitudinal axis of the end-fittings.

* * * * *